(12) United States Patent
Selvin et al.

(10) Patent No.: US 8,717,673 B2
(45) Date of Patent: May 6, 2014

(54) SIMPLE ULTRA-STABLE STAGE WITH BUILT-IN FIDUCIARY MARKERS FOR FLUORESCENCE NANOSCOPY

(75) Inventors: Paul R. Selvin, Urbana, IL (US); Sang Hak Lee, Urbana, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 475 days.

(21) Appl. No.: 13/118,400

(22) Filed: May 28, 2011

(65) Prior Publication Data

US 2012/0300293 A1 Nov. 29, 2012

(51) Int. Cl.
*G02B 21/34* (2006.01)
*G02B 27/32* (2006.01)
*G02B 21/00* (2006.01)

(52) U.S. Cl.
CPC ............... *G02B 21/34* (2013.01); *G02B 27/32* (2013.01); *G02B 21/00* (2013.01)
USPC ........................... 359/397; 359/396; 359/368

(58) Field of Classification Search
CPC ........ G02B 21/34; G02B 21/26; G02B 21/00; G02B 27/32
USPC .................................. 359/368, 391, 396–398
See application file for complete search history.

(56) References Cited

U.S. PATENT DOCUMENTS

| | | | | |
|---|---|---|---|---|
| 4,022,521 A * | 5/1977 | Hall et al. | | 359/398 |
| 4,183,614 A * | 1/1980 | Feldman | | 359/397 |
| 4,977,078 A * | 12/1990 | Niimura et al. | | 435/7.24 |
| 5,892,230 A * | 4/1999 | Goodberlet et al. | | 250/361 R |
| 6,713,238 B1 * | 3/2004 | Chou et al. | | 430/322 |
| 7,330,307 B2 * | 2/2008 | Steele | | 359/391 |
| 2005/0282175 A1 * | 12/2005 | Taylor et al. | | 435/6 |
| 2009/0141376 A1 * | 6/2009 | Smith et al. | | 359/833 |

\* cited by examiner

*Primary Examiner* — Thong Nguyen
(74) *Attorney, Agent, or Firm* — Richard Aron Osman

(57) ABSTRACT

An improved microscope stage mount with built-in fiduciary markers is used for fluorescence microscopy, and comprises: (a) an optically-transparent glass plate adapted for specimen mounting and microscope viewing and comprising a specimen mounting area; and (b) a defined and ordered, two-dimensional microscopic array of fiduciary markers, wherein the markers are polymeric pillars affixed to the plate about the specimen mounting area, wherein the markers provide a three-dimensional spatial reference for the specimen.

19 Claims, 4 Drawing Sheets

On top view

SIMPLE ULTRA-STABLE STAGE WITH BUILT-IN FIDUCIARY MARKERS FOR FLUORESCENCE NANOSCOPY

This invention was made with government support under grant/contract number GM068625 awarded by the National Institutes of Health and grant/contract number DBI0649779 awarded by the National Science Foundation. The government has certain rights in the invention.

FIELD OF THE INVENTION

The field of the invention is calibration tools for high-resolution fluorescence microscopy.

BACKGROUND OF THE INVENTION

A general goal in optical fluorescence microscopy is to improve the resolution much below the optical limit, which is about 250 nm Recent techniques, such as STORM (Bates, et al., Science, 317, p. 1749-53, 2007) and PALM (Betzig et al., Science, 313, p. 1642-5, 2006) have achieved ~20 nm. In general, visible fluorescence is used to track the motion or position of a biological marker of interest. But in order to get such fine resolution (~20 nm), one must be sure that either that the stage does not undergo motion greater than this amount, or to account for this motion and then subtract it off.

The introduction of a fiducial mark or a reference point provides a means to measure and minimize objective-sample drift. For example, a micrometer-sized bead can be affixed to the microscope cover slip, the position of which is deduced using video-imaging analysis. Such analysis has been used in a feedback loop to stabilize an optical microscope in three dimensions, recently achieving ~0.8 nm stabilization in each axis at 25 Hz (Steffen, et al. Proc. Natl. Acad. Sci. U.S.A. 98, 14949-14954 (2001); Capitanio, et al. Eur. Phys. J. B 46, 1-8 (2005). More recently, Carter et al. (Applied Optics 46, 421-27, 2007) described stabilization of an optical microscope to 0.1 nm in three dimensions by measuring the position of a fiducial mark coupled to the microscope cover slip using back-focal-plane (BFP) detection and correcting for the drift using a piezoelectric stage. See also Perkins et al., U.S. Pat. No. 7,928,409.

However, these methods are expensive, require sophisticated equipment and/or are difficult to use effectively. For example, Carter et al. (supra) requires electron beam lithography and an extremely sophisticated optical trap to control the stage in 3 dimensions. Simpler gold particles or beads can be used, as seen with both PALM and STORM for example, but these have their own limitations: it is awkward to place the correct amount of beads, to get them to stick so they don't move with respect to the slide, to interrogate them at a wavelength that does not interfere with the sample, and to make them biologically and chemically inert with respect to the sample.

Here we provide a solution that is universal, simple, and immune to sample interference: an inexpensive, easy-to-make, microscope stage mount with a stably built-in ordered, two-dimensional array of fiduciary markers, easily monitored or detected by optical means.

MikroMasch, Inc. (Talinn, Estonia; http://www.spmtips.com/tgz) produces a variety of atomic force microscopy (AFM) tips and calibration gratings. Sun, et al. (Nature Struct and Mol Biol, 17 (4), 485-492, 2010) used such a silicon AFM calibration grating (MikroMasch TGZ03) in a micromolding procedure to make a PMMA microstructure for measuring myosin movement. While Sun's application is unrelated to stage calibration, and his one dimensional (linear grooves and pedestals) microstructures are inapplicable to stage calibration, the same manufacturing processes the can be extended to produce our two-dimensional arrays.

SUMMARY OF THE INVENTION

The invention provides a microscope stage mount with built-in fiduciary markers for fluorescence microscopy, methods of making and using the mount. A major advantage of our invention is the efficient, cost-effective and simple provision of fiduciary markers that are stably fixed to the plate (e.g. coverslip) and easily detectable. Our system works well both in vitro and on living cells, in 1 and 2-photon excitation schemes, and in physiological tissues.

In one embodiment the mount comprises: (a) an optically-transparent glass plate adapted for specimen mounting and microscope viewing and comprising a specimen mounting area; and (b) a defined and ordered, two-dimensional microscopic array of fiduciary markers, wherein the markers are poly(methyl methacrylate) (PMMA) or polymethylglutarimide (PMGI) pillars, each about 0.3 to 4 µm across and about 0.3 to 4 µm tall, spaced about 3 to 45 µm apart, preferably about 5 to 15 µm apart, affixed to the plate about the specimen mounting area, wherein the markers provide a three-dimensional spatial reference for the specimen.

PMMA and PMGI are good materials for the markers because they are relatively plate-adhesive and biocompatible, and glass provides an inexpensive, optically-transparent plate with well-established physical and chemical properties. In practice the plate will typically be a microscope slide or coverslip.

The precise pillar size can vary, but the pillars of a given mount should be defined (nonrandom and predetermined in size and shape) and are preferably relatively uniform in size and shape and evenly-spaced apart to facilitate calibration. Exemplified below are pillars nominally about 1 µm across and about 1 µm high (measured by us to be less than 1 µm, about 0.885 µm); however, pillars of nominal dimensions of about 0.5, 1.5, 2, 2.5, 3, 3.5 and 4 µm (x, y and z dimensions) work well, and the height (z-dimension) need not be the same as the side dimensions.

The arrays can be constructed in a variety of sizes and shapes, but we typically make them squared to match the squared specimen mounting area or the coverslip. The arrays typically comprise from $10^2$ to $10^8$, and more typically from $10^3$ to $10^5$, pillars. For example, in one embodiment, for a 15 mm square area we made and used an array of 1000×1000 µm³ pillars, spaced in x,y directions on 15 µm centers. To facilitate convenience of construction and use, the arrays are defined, they comprise pillars of defined (nonrandom and predetermined, size, shape and spacing. In preferred embodiments the pillars are of uniform size and spacing, though this is not absolutely required, and depending on the application, the sizes and spacing can vary across the array.

The invention also provides materials and methods for making the subject stage mounts. In one embodiment the invention provides a method of making a subject stage mount, comprising the step of: constructing an optically-transparent plate adapted for specimen mounting and microscope viewing and comprising a specimen mounting area by affixing thereto and about the specimen mounting area an ordered, microscopic array of fiduciary markers, wherein the markers are poly(methyl methacrylate) (PMMA) or polymethylglutarimide (PMGI) pillars, each about 0.3 to 4 µm across and about 0.3 to 4 µm tall, spaced about 5 to 15 µm apart, wherein the markers provide a three-dimensional spatial reference for the specimen. The mounting area may optionally comprise a coating, such as polyethylene glycol (PEG) or an adherent protein or protein mixture (e.g. fibronectin, albumin, non-specific protein blocking buffers, etc.) to minimize non-specific labeling.

In particular embodiments of this method the affixing step comprises pressing a rigid polydimethylsiloxane (PDMS) mask comprising an array of microscopic holes into a layer of liquid PMMA on the surface of an optically transparent plate, particularly wherein the PDMS mask is imprinted from a correspondingly pegged silicon mask etched from a chip of silicon coated with a layer of silicon nitride, commonly represented as $Si_3N_4$, or silicon dioxide—generally $SiO_2$, but can also be or include oxidized forms including SiO, $SiO_4$, and $Si_3O_4$. Theses corresponding rigid PDMS and pegged silicon masks are also part of our invention, as well as manufacturing kits comprising these intermediates.

The invention also provides material and methods for using the subject stage mounts. In one embodiment the invention provides a method of using on a microscope stage a subject stage mount further comprising a specimen mounted thereon, comprising the steps of: (a) illuminating the pillars; (b) detecting resultant diffraction at the pillars with a charge-coupled device (CCD) to determine a reference position; (c) illuminating the specimen; (d) detecting optically the specimen to determine its relative location; and (e) subtracting the reference position from the measured position to determine an absolute position. For thicker mounts, like standard microscope slides, one can advantageously use an extra focusing lens before the CCD.

In particular embodiments of this method the pillars are illuminated with infra-red light defocused at the plane of the pillars, and step (b) comprises detecting resultant diffraction at the pillars to determine a reference position in x, y and z dimensions. While the illumination can be with UV or visible light, IR light provides unique advantages, further discussed below.

In the simplest scheme the system "passively" measures the microscope stage, which is then divided or subtracted out from the visible fluorescence of interest. This mode does not require any fancy stages—in fact, one can get nanometer accuracy with the usual commercially-available stages—converting a "microscope" into a "nanoscope". In another embodiment it is used to "actively" feedback a signal to microscope stages to minimize stage drift. Hence, in particular embodiments, the subtracting step occurs in real time, providing a continuous feedback signal to a drift corrector which in turn reduces drift of the microscope stage.

DETAILED DESCRIPTION OF SPECIFIC EMBODIMENTS OF THE INVENTION

We placed PMMA pillars, approximately 1 µm in diameter, and 1 µm in tall, every 15 µm—these numbers are adjustable.

These pillars are fiduciary markers that do not move with respect to the coverslip and are immune to relevant biological and chemical processes. By exciting these with (near) intra-red (IR) light, they undergo significant diffraction, which we used to track the fiduciary markers. Furthermore, by shining IR light in a way which is defocused at the plane of the fiduciary markers, we can easily get the 3-dimensional (x, y, z) position of these pillars. Finally, because the (biological) signal of interest is visible fluorescence, the biological signal can be easily separated out from the IR signal coming from the fiduciary markers; hence they both can be read out and do not interfere with each other. The IR signal is read out by a simple, inexpensive CCD detector, and either used in a passive or active mode.

The wavelength of the IR light depends on the visible fluorescence being measured. As long as the IR light is longer than the visible fluorescence, it should not interfere. Visible often exchanges to about 700 or 750 nm, so in general you have longer wavelength than this so you never have to change the IR-used in light detection. However, using very short wavelength of fluorescence—e.g. from 350-400 nm light, permits use of 450 nm light for your fiduciary marker detection. Using the shortest possible IR light is theoretically advantageous by providing better resolution with shorter wavelength (resolution is generally a function of Lambda/2).

Figure 1:
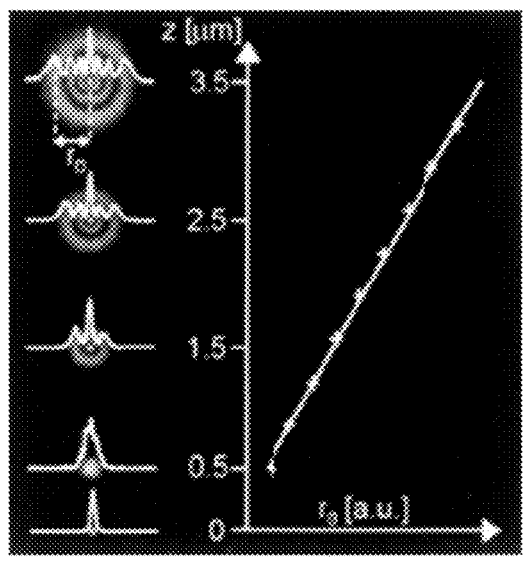
FIG. 1: Diffraction rings and ability to get z dimension from the outer radius of ring.

As shown in FIG. 1 a small object (fiduciary marker) will create diffraction rings of light. The center of the object in (x, y) can be determined by locating the center. The z-direction can be determined by looking at the number of rings and measuring the distance from the outer-ring to the center ($r_o$ in FIG. 1). $R_o$ is directly related to how far (z) the pillar is from the focal plane (right-hand-side of FIG. 1). As long as the fiduciary markers are attached rigidly to the slide or coverslip holding the biological system of interest, this x,y,z marker information provides an accurate control for any motion of the sample.

Figure 2:
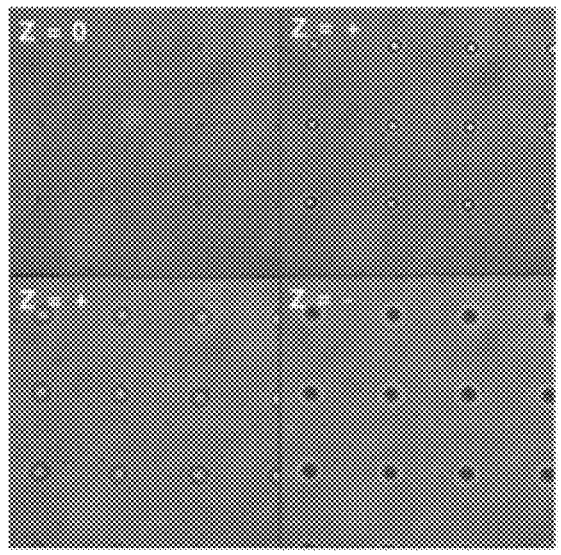
FIG. 2: PMMA fiduciary markers, placed every 15 µm and approximately 1 µm×1 µm×1 µm (x,y,z) in size.
Figure 3:
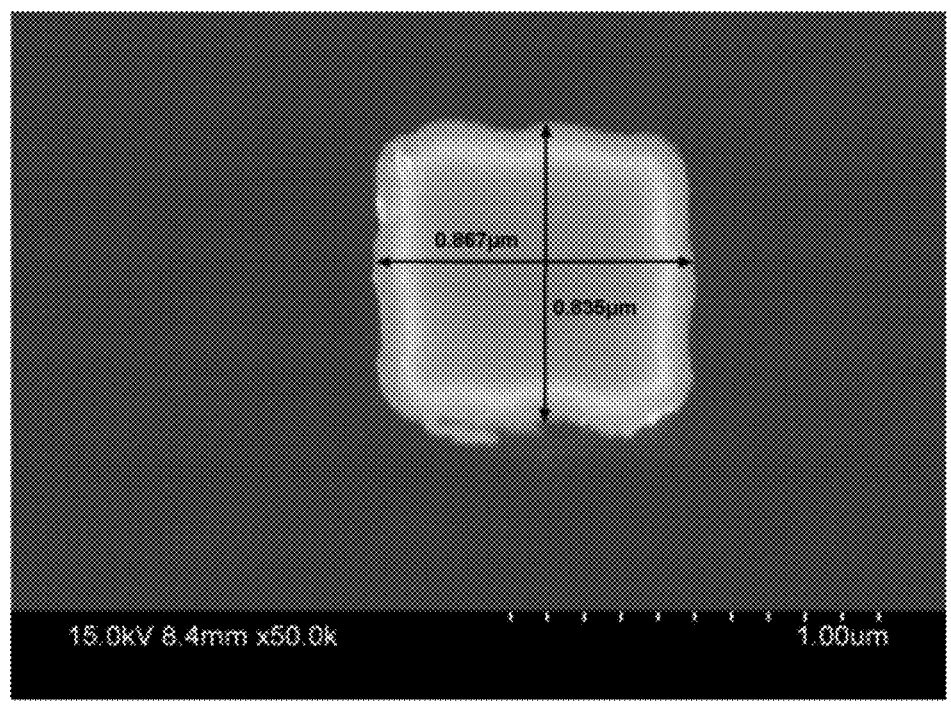
FIG. 3: Electron Micrographs of the fiduciary markers indicates that they are 0.867 µm×0.835 µm and 0.76 µm tall.

FIG. 2 shows a series of fiduciary markers made of PMMA, placed every 15 µm o.c. (on center) on a coverslip, and each approximately 0.85 µm on its side, 0.76 µm on the z-dimension (FIG. 3). If one shines infrared (IR) light at them, and then collects the image with a CCD, when z=0 the pillars are in focus, with no diffraction rings. If the slide/coverslip is moved, either up (+) or down (−), changing the distance from the focal plane, then diffraction patterns appear and the magnitude of the z-shift can be determined if a calibration is made (as in FIG. 1).

Figure 4:
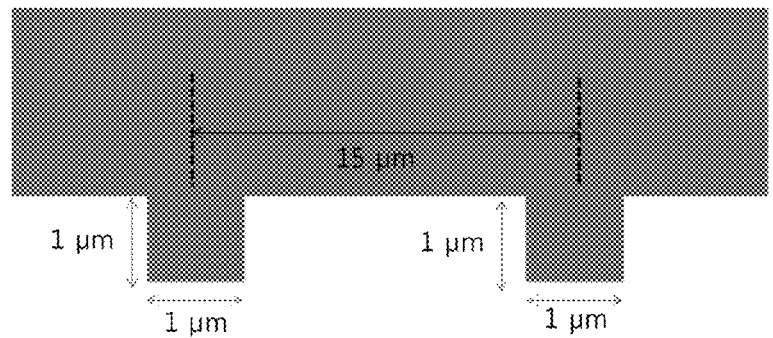
FIG. 4: Schematic for building the mask (silicon, coated with $SiN_3$).
Figure 4:
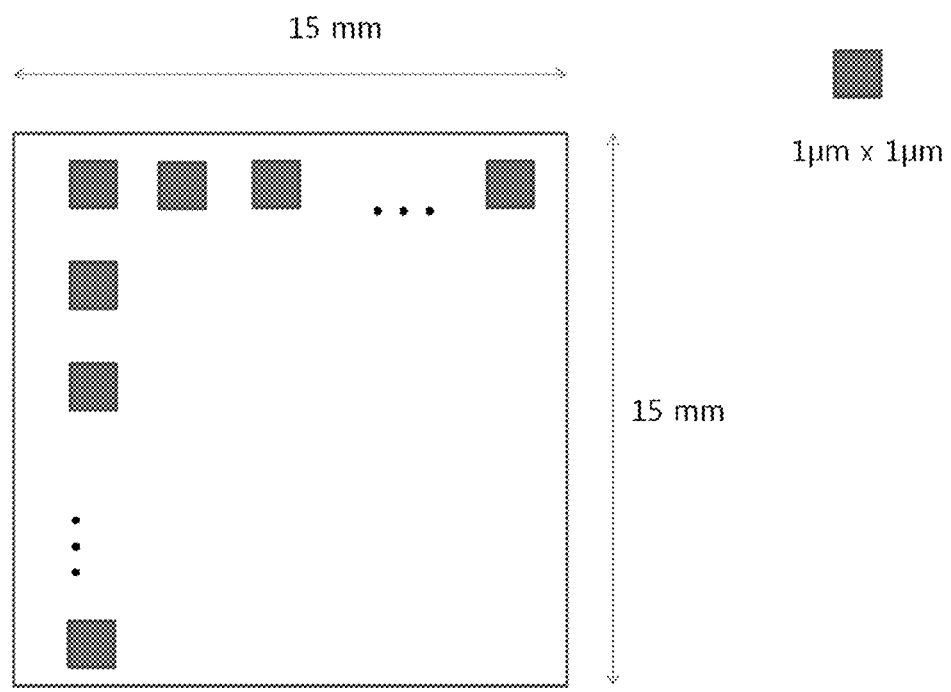

To create the PMMA pillars, a silicon mask was made out of silicon coated with a layer of $SiN_3$. FIG. 4 shows a schematic. A series of (approximately) 1 µm×1 µm×1 µm pegs placed every 15 µm, was created. From this, a PDMS mask was imprinted, which has holes corresponding positionally to the pegs of the mask. Liquid PMMA is then poured on to a coverslip and the PDMS is pressed against this. Upon heating (typically, 15-30 minutes at about 40-70 C (or about 60 C) in a conventional laboratory oven) and then cooling to room temperature, coverslips with solid PMMA pillars were created (FIG. 2).

Next we provided a mechanism for detecting the diffracted light. Here a simple IR diode light (λ=785 nm, was chosen, although any region which is far away from the visible fluorescence of the sample, and short enough in wavelength, that it is still in a sensitive wavelength region of the detector, should be fine. The diode is placed above the sample (e.g. near the microscope condenser in an inverted microscope configuration) and light is collected by the microscope objective. For detection, we used a dichroic filter cube which splits the light such that the IR light is sent in one direction towards an IR-sensitive CCD, and the visible light is sent to the regular EMCCD for collection of the visible fluorescence. A lens may be used where necessary to focus the light onto the IR-CCD, depending, for example, on whether the fiduciary markers are placed on the coverslip, or on the slide; the visible fluorescence may or may not be placed at the same position. The signals are then recorded.

In the "passive" mode, the position of the sample on the EMCCD is divided by the signal from the IRCCD, thereby eliminating any effect of external motion (such as microscope drift). In an active mode, the output of the CCD is then sent back to x-y and optionally z-motorized stages, and any drift is corrected for.

We found it especially convenient to use PMMA and IR-light to track the fiduciary markers—both an IR source and a CCD are very easy and inexpensive to purchase; the diffraction of the pillars is in the IR and this wavelength is far from the visible fluorescence, and hence does not interfere with the biologically relevant signal; because PMMA is made at very high purity, it is known to have very little autofluorescence—hence, with little background (visible) fluorescence, small signals can be seen; and PMMA can be attached fairly straightforwardly, and with little effort, to glass slides or coverslips.

A variety of alternative "passive" or "active" systems are readily constructed. One embodiment is a completely passive system. Another is passive in x-y and active with z. This ensures that the microscope is always in a z-range where, for example, you can always perform Total Internal Reflection Fluorescence (where you need to be within 50 nm). Yet another embodiment is a fully automatic correction system.

Figure 5:
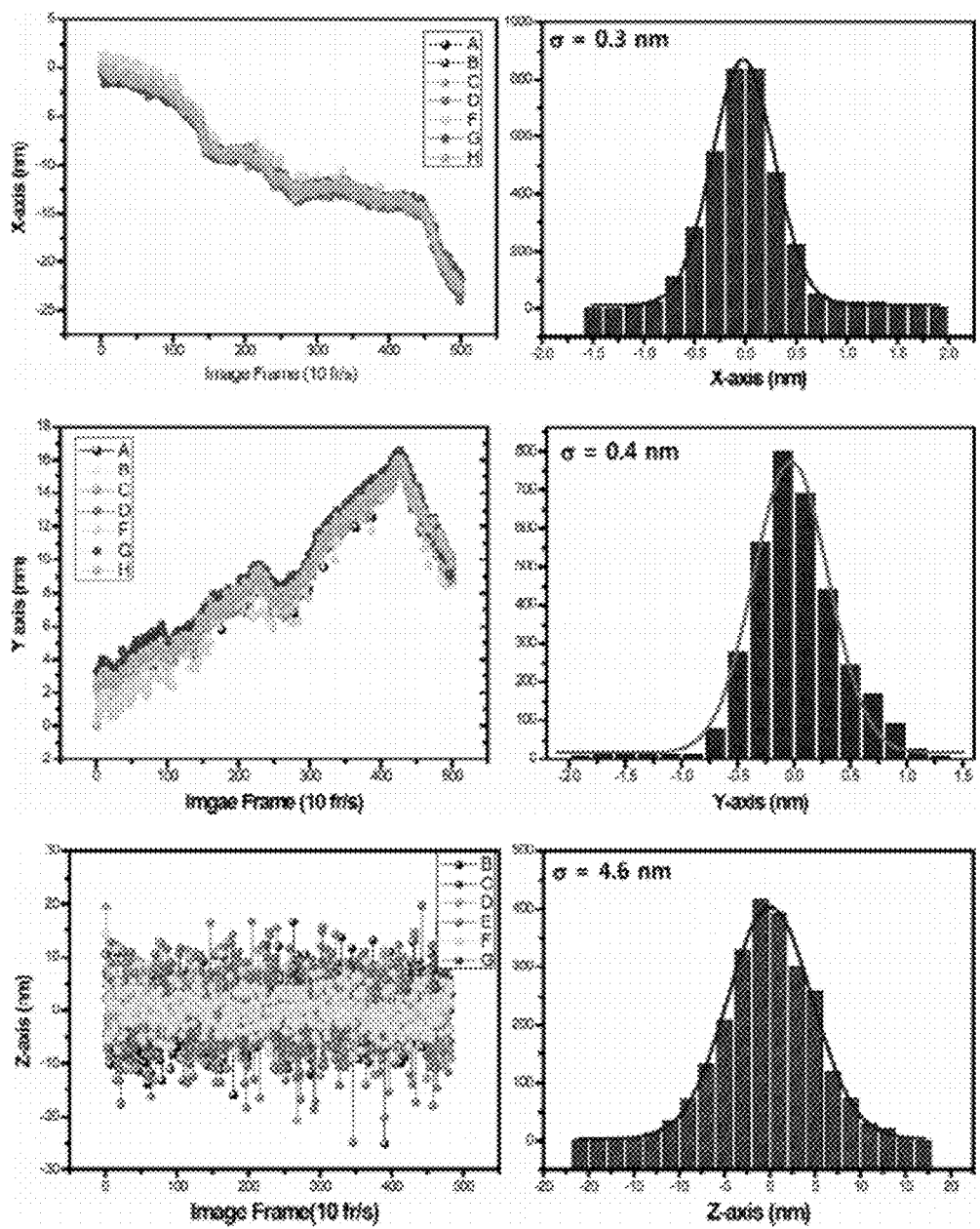
FIG. 5. x-, y-, and z-motion measured to better than 1 nm and <5 nm, respectively.

FIG. 5 shows <1 nm accuracy in x-y and <5 nm accuracy in z. This extraordinary accuracy was achieved by averaging 7 pillars.

The foregoing examples and detailed description are offered by way of illustration and not by way of limitation. All publications and patent applications cited in this specification are herein incorporated by reference as if each individual publication or patent application were specifically and individually indicated to be incorporated by reference. The invention includes all possible combinations of embodiments recited herein as though belaboredly recited by matrices of such embodiments. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims

What is claimed is:

1. A microscope stage mount with built in fiduciary markers for fluorescence microscopy, the mount comprising:
   (a) an optically-transparent glass plate adapted for specimen mounting and microscope viewing and comprising a specimen mounting area; and
   (b) a defined and ordered two-dimensional microscopic array of fiduciary markers, wherein the markers are poly(methyl methacrylate) (PMMA) or polymethylglutarimide (PMGI) pillars, each about 0.3 to 4 µm across and about 0.3 to 4 µm tall, spaced about 3 to 45 µm apart, affixed to the plate about the specimen mounting area, wherein the markers provide a three-dimensional spatial reference for a specimen.

2. The mount of claim 1 wherein the markers are about 0.5, 1.5, 2, 2.5, 3, 3.5 or 4 µm, in x dimension, about 0.5, 1.5, 2, 2.5, 3, 3.5 or 4 µm in y dimension, and about 0.5, 1.5, 2, 2.5, 3, 3.5 or 4 in z dimensions.

3. The mount of claim 1 wherein the markers are spaced about 5 to 15 µm apart.

4. The mount of claim 1 wherein the markers are uniformly sized and spaced.

5. The mount of claim 1 wherein the array comprises from $10^2$ to $10^8$ markers.

6. The mount of claim 1, wherein the pillars are poly(methyl methacrylate (PMMA).

7. The mount of claim 1 wherein markers are spaced about 5 to 15 µm apart; the pillars are uniformly sized and spaced; and the array comprises from $10^2$ to $10^8$ pillars.

8. The mount of claim 1 wherein the markers are spaced about 5 to 15 µm apart; the markers are uniformly sized and spaced; the array comprises from $10^2$ to $10^8$ pillars; and the markers are poly(methyl methacrylate) (PMMA).

9. A method of making the stage mount of claim 1, comprising the steps of:
   constructing an optically-transparent plate adapted for specimen mounting and microscope viewing and comprising a specimen mounting area by affixing thereto and about the specimen mounting area an ordered, microscopic array of fiduciary markers, wherein the markers are uniformly sized and spaced poly(methyl methacrylate) (PMMA) or polymethylglutarimide (PMGI) pillars, each about 0.3 to 4 µm across and about 0.3 to 4 µm tall, spaced about 5 to 15 µm apart, wherein the markers provide a three-dimensional spatial reference for the specimen.

10. The method of claim 9 wherein the affixing step comprises:
    pressing a rigid polydimethylsiloxane (PDMS) mask comprising an array of microscopic holes into a layer of liquid PMMA on the surface of an optically transparent plate.

11. The method of claim 10 wherein the PDMS mask is imprinted from a correspondingly pegged silicon mask etched from a chip of silicon coated with a layer of silicon nitride or silicon dioxide.

12. A method of using on a microscope stage the stage mount of claim 1 further comprising a specimen mounted thereon, comprising the steps of:
    (a) illuminating the pillars;
    (b) detecting resultant diffraction at the pillars with a charge-coupled device (CCD) to determine a reference position;
    (c) illuminating the specimen;
    (d) detecting optically the specimen to determine its relative location; and
    (e) subtracting the reference position from the measured position to determine an absolute position.

13. The method of claim 12, wherein the pillars are illuminated with infra-red light.

14. The method of claim 12 wherein the pillars are illuminated with infra-red light defocused at the plane of the pillars, and step (b) comprises detecting resultant diffraction at the pillars to determine a reference position in x, y and z dimensions.

15. The method of claim 12 wherein the subtracting step occurs in real time, providing a continuous feedback signal to a drift corrector which in turn reduces drift of the microscope stage.

16. The method of claim 12, wherein the reference position is determined within <1 nm accuracy in x dimension, within <1 nm in y dimension, and within <5 nm accuracy in z dimension.

17. The mount of claim 1 wherein the makers are about 1µ in x, y and z dimensions, and spaced about 15 µm apart; the array comprises from $10^2$ to $10^8$ pillars; and the markers are poly(methyl methacrylate (PMMA).

18. The mount of claim 1 further comprising the specimen, wherein the mounting area and the array are illuminated with a defined wavelength infrared (IR) light.

19. The mount of claim 1 further comprising the specimen, wherein the mounting area and the array are illuminated with a defined wavelength infrared (IR) light, wherein the wavelength is 785 nm.

* * * * *